United States Patent [19]

Sylvester

[11] Patent Number: 4,992,483

[45] Date of Patent: Feb. 12, 1991

[54] POLYURETHANE FOAM PRODUCT AND PROCESS

[75] Inventor: Robert G. Sylvester, Georgetown, Canada

[73] Assignee: Du Pont Canada Inc., Mississauga, Canada

[21] Appl. No.: 395,515

[22] Filed: Aug. 18, 1989

[51] Int. Cl.$^5$ .............................................. C08G 18/14
[52] U.S. Cl. .................................. 521/131; 252/182.21
[58] Field of Search ..................... 521/131; 252/182.24

[56] References Cited

U.S. PATENT DOCUMENTS 4,636,529  1/1987  Crooker ............................. 521/131
4,713,399  12/1987  Webb et al. ......................... 521/131

OTHER PUBLICATIONS

Paper presented to Soc. for Plastics Industry (SPI), 31st Annual Technical/Marketing Conf., Phila., Pa., Oct. 18-21, 1988, (Creazzo, Bartlett & Ascough).
Abstract of Paper Proposed for 32nd Annual Polyurethane Conf., Oct. 1-4, 1989, "Alternative Blowing Agent Field Trials in Flexible Polyurethane Operations", prepared by Sylvester, Ascough.
Abstract of Paper proposed for 32nd Annual Polyurethane Conf., Oct. 1-4, 1989, "An Evaluation of HCFC-123 and HCFC-141b as Auxiliary Blowing Agents for Flexible Polyurethane Foam", prepared by Allied-Signal Inc.

*Primary Examiner*—Maurice J. Welsh
*Assistant Examiner*—D. Troung

[57] ABSTRACT

A process for preparing polyurethane foams comprising reacting polyol with polyfunctional isocyanate in the presence of an auxiliary blowing agent comprising 1 monofluoro 1,1 dichloroethane. The amount of auxiliary blowing agent used is from 60 to 80 wt % of the amount of conventional auxiliary blowing agent consisting of trichlorofluoromethane that would be required to obtain comparable foam density and either firmness or compressive strength.

8 Claims, No Drawings

POLYURETHANE FOAM PRODUCT AND PROCESS

BACKGROUND OF THE INVENTION

This invention relates to polyurethane foam and a method of manufacturing polyurethane foam.

Polyurethane foam is conventionally manufactured by reacting polyols with polyfunctional isocyanates in the presence of a small amount of water. Carbon, dioxide is generated in the reaction between isocyanate and water and acts as the primary blowing agent. Commonly a chlorofluoroalkane, usually trichlorofluoromethane (CFC-11) is added to the reaction mixture as an auxiliary blowing agent. Other auxiliary blowing agents such as methylene chloride and methylene chloride/chlorofluoroalkane blends may be used, but these blowing agents are difficult to handle due to their toxicity.

U.S. Pat. No. 4,076,644 (E. I. du Pont de Nemours and Company) discloses polyurethane foams prepared using 1,1 dichloro 2,2,2, trifluoroethane (CFC-123) as the auxiliary blowing agent. This blowing agent is less efficient than CFC11, so more of it is required to make foams of comparable density.

SUMMARY OF THE INVENTION

The present invention provides an improved process for the preparation of flexible polyurethane foams which uses an improved auxiliary blowing agent.

Accordingly, there is provided a process for preparing flexible polyurethane foams comprising reacting polyol with polyfunctional isocyanate in the presence of an auxiliary blowing agent comprising 1 monofluoro 1,1 dichloroethane, wherein the amount of auxiliary blowing agent used is from 60 to 80 wt % of the amount of conventional auxiliary blowing agent consisting of trichlorofluoromethane that would be required to obtain comparable foam density and firmness.

In another one of its aspects the invention provides a mixture comprising polyol suitable for flexible polyurethane foam preparation and an auxiliary blowing agent comprising 1 monofluoro 1,1 dichloroethane, wherein the amount of said auxiliary blowing agent used is about 60 to 80 wt % of the amount of conventional auxiliary blowing agent consisting of trichlorofluoromethane that would be required to obtain comparable foam density and firmness.

It has been found that with the present invention, significantly less auxiliary blowing agent is required to provide flexible foam of comparable density and firmness to conventional flexible foam made using CFC11 as the auxiliary blowing agent. This reduction results in a substantial cost saving and reduced depletion of the ozone layer. Although applicant does not wish to be bound by any particular theory, it is believed that the auxiliary blowing agent of the present invention can be used in smaller amounts because it provides a better heat sink for the exothermic reaction between polyol and isocyanate. This auxiliary blowing agent also has a higher boiling point than CFC-11 so it probably evaporates at a later stage of the reaction, which may enhance the rate of reaction.

DESCRIPTION OF THE PREFERRED EMBODIMENTS

The present invention may be used to make a wide variety of flexible polyurethane foams. Typical processes for preparing polyurethane foams that may be used are disclosed in U.S. Pat. Nos. 3,072,582; 3,159,591 and 3,298,974.

These foams are conventionally prepared by the reaction of organic diisocyanates with polyols. Master batches of polyol containing the auxiliary blowing agent of the present invention may be prepared for storage or shipment to a production facility. In addition, other additives including water, catalysts such as tertiary amines ortin compounds, silicone surfactants and fire retardants may be added to the reaction mixture.

The auxiliary blowing agents of the present invention are used in substantially the same manner as CFC-11 auxiliary blowing agents. However, only 60 to 80 wt % of the amount of the CFC-11 blowing agent conventionally used is required. Preferably, 65 to 80 wt % auxiliary blowing agent is used and most preferably, 70-80 wt % blowing agent is used. Generally less than 35 parts HCFC-141b per 100 parts polyol may be used depending on the desired density of the foam.

The quality of polyurethane foam for a given application is determined by two main parameters, density and firmness. The optimum density and firmness of polyurethane foam will vary depending on the desired end use.

Flexible foam having optimum density may be used to provide more comfortable furniture since it is less likely to fatigue or become permanently deformed. Foam density is generally reported as the weight in pounds of one cubic foot of foam. Generally the acceptable density range for flexible foams is 1-2.5 pcf.

The firmness of the foam is usually measured in terms of its indentation load deflection or ILD (this is also referred to as IFD, indentation force deflection). Generally, the acceptable IFD range is from 15 to 35 for flexible foams. Both density and IFD tests are described extensively and carried out in accordance with ANSI/ASTM D 3574-77 in which density is determined by "Test A-Density Test" and IFD is determined by "Test B$_1$-Indentation Force Deflection Test (To Specified Deflection)".

The term "comparable" as used herein means that the foam is within industrially acceptable limits for a given application. For flexible foams, "comparable" density preferably means within about plus or minus 5% of the desired density and most preferably plus or minus 2% and "comparable" firmness preferably means within about plus or minus 7% of the desired firmness for a given application and most preferably plus or minus 5%.

Other less important foam quality measurements include the indentation modulus, compression set, tensile strength and elongation. These tests are described extensively and carried out in accordance with ANSI/ASTM D 3574-77 as follows:

Indentation modulus is determined by "Definition $\times 3.5$.";

Compression set is determined by "Test D-Constant Deflection Compression Set Test"; and Tensile strength and elongation are determined by "Test E-Tension Test".

The invention is further illustrated by the following specific examples in which parts and percentages are by weight unless otherwise indicated.

EXAMPLE 1

Two basic foam formulations containing CFC-11 as the auxiliary blowing agent and five modified formulations in which varying amounts of HCFC-141b are substituted for CFC-11 as the auxiliary blowing agent were prepared and mixed by conventional methods. The basic foam formulations are labelled A and F and the modified formulations are labelled B,C,D,E and G in Table 1. Each of the formulations was conveyed to a lined box which was 4 feet wide by 3 feet high by 6 feet long. The pour time for each formulation into its respective box was between 10 and 15 seconds. When the resultant polyurethane foam samples had partially cured and solidified, they were removed from their box good white colour, with no evidence of yellowing or browning, which may occur if undersirable chemical reactions and/or overheating are present.

The results in Table 3 indicate that the physical properties of modified formulations B,C, and D were comparable to that of base formulation A and the physical properties of modified formulation G was comparable to that of base formulation F.

The temperature measurements taken by the thermocouples indicated that the reaction temperature did not exceed desired levels.

TABLE 1

COMPARATIVE FORMULATIONS FOR TRIAL RUNS

| MATERIAL[1] | TRIAL # | | | | | | |
|---|---|---|---|---|---|---|---|
| | A | B | C | D | E | F | G |
| Polyol | 100.00 | 100.00 | 100.00 | 100.00 | 100.00 | 100.00 | 100.00 |
| T.D.I. (80/20 index) | 60.15 | 60.15 | 60.15 | 60.15 | 60.15 | 60.15 | 60.15 |
| $H_2O$ (water) | 4.90 | 4.90 | 4.90 | 4.90 | 4.90 | 4.90 | 4.90 |
| Amine Catalyst A200 | 0.120 | 0.120 | 0.120 | 0.120 | 0.120 | 0.120 | 0.120 |
| Stannous Octoate Catalyst (TIN) | 0.270 | 0.270 | 0.270 | 0.270 | 0.270 | 0.270 | 0.270 |
| Silicone Surfactant | 1.45 | 1.45 | 1.45 | 1.45 | 1.45 | 1.45 | 1.45 |
| D.I.D.P. | 0.726 | 0.726 | 0.726 | 0.726 | 0.726 | 0.726 | 0.726 |
| Aux. Blowing Agent/type | 3.5 CFC-11 | 3.57 HCFC-141b | 3.03 HCFC-141B | 2.5 HCFC-141B | 2.0 HCFC-141B | 3.5 CFC-11 | 2.25 HCFC-141B |
| Polyol: | Dow Grade 3500 | | | | | | |
| T.D.I. | Mobay; Toluene di-isocyanate 80/20 80%: 2,4 isomer 20%: 2,6 isomer | | | | | | |
| Amine Catalyst: | Air Products Dabco* A200 | | | | | | |
| Silicone Surfactant: | Union Carbide L6202 Di-isodecyl phthalate | | | | | | |

[1]All figures expressed in parts per hundred parts polyol
*denotes Trademark

TABLE 2

| MEASUREMENT/ OBSERVATION | OBSERVATIONS/RESULTS | | | | | | |
|---|---|---|---|---|---|---|---|
| | TRIAL # | | | | | | |
| | A | B | C | D | E | F | G |
| Odour | Medium Strong | Strong | Strong | Strong | Medium Strong | Medium Strong | Medium Strong |
| $CO_2$ loss (pbw) | 11.96 | 11.96 | 11.96 | 11.96 | 11.96 | 11.96 | 11.96 |
| B.A. loss (pbw) | 3.50 | 3.57 | 3.03 | 2.50 | 2.00 | 3.50 | 2.25 |
| Total gass loss (pbw) | 15.46 | 15.33 | 14.99 | 14.46 | 13.96 | 15.46 | 14.21 |
| Rise Time (sec.) | 122 | 90 | 104 | 120 | 115 | 95 | 92 |
| Colour | ok | ok | ok | ok | ok | ok | ok |
| Density (pcf) | 1.07 | 1.04 | 1.08 | 1.09 | 1.09 | 1.06 | 1.09 |
| ILD 25% | 29.0 | 29.7 | 29.7 | 30.3 | 33.3 | 29.7 | 28.0 |
| ILD 65% | 55.7 | 57.3 | 56.3 | 58.7 | 64.7 | 53.7 | 52.0 |
| Indentation Modulus | 1.92 | 1.93 | 1.90 | 1.93 | 1.94 | 1.88 | 1.80 |
| Compression Set (%) | 4 | 4 | 8 | 8 | 4 | 8 | 8 |
| Tensile Strength (psi) | 16 | 16 | 16 | 17 | 15 | 19 | 19 |
| Elongation (%) | 220 | 220 | 220 | 155 | 175 | 185 | 176 | and a thermocouple was inserted into the core of each sample and temperature measurements were taken regularly over a period of several hours to ensure that exothermic heat-buildup was not severe over the extended curing period.

Standard laboratory equipment conventionally used in the flexible polyurethane foam industry was used to measure foam properties after curing. These measurements are reported in Table 2. The physical tests reported in this table were conducted several days after the foam had cured, whereas the other observations were made as soon as the foam was cured. The average density measurements reported are based on the average of three separate density measurements per sample. The odour and colour measurements reported are subjective. A strong odour was noted for formulations B, C and D. The odour of formulations A, E, F and G were less pungent. The colour designation "OK" refers to a

I claim:
1. A process for preparing flexible polyurethane foams comprising reacting polyol with polyfunctional isocyanate in the presence of an auxiliary blowing agent comprising 1 monofluoro 1,1 dichloroethane, wherein the amount of auxiliary blowing agent used is from 60 to 80 wt % of the amount of conventional auxiliary blowing agent consisting of trichlorofluoromethane that would be required to obtain comparable foam density and either firmness or compressive strength.

2. The process of claim 1 wherein foam density is within about plus or minus 5% of the desired density and the foam firmness is within about plus or minus 7% of the desired firmness.

3. The mixture of claim 1 wherein 65 to 80 wt % of the amount of conventional auxiliary blowing agent is used.

4. The mixture of claim 1 wherein 70 to 80 wt % of the amount of conventional auxiliary blowing agent is used.

5. A mixture comprising polyol suitable for flexible polyurethane foam preparation and an auxiliary blowing agent comprising 1 monofluoro 1,1 dichloroethane, wherein the amount of said auxiliary blowing agent used is about 60 to 80 wt % of the amount of conventional auxiliary blowing agent consisting of trichlorofluoromethane that would be required to obtain comparable foam density and either firmness or compressive strength.

6. The mixture of claim 5 wherein the foam density is within about plus or minus 5% of the desired density and the foam firmness is within about plus or minus 7% of the desired firmness.

7. The mixture of claim 6 wherein 65 to 80 wt % of the amount of conventional auxiliary blowing agent is used.

8. The mixture of claim 6 wherein 70 to 80 wt % of the amount of conventional auxiliary blowing agent is used.

* * * * *